INVENTOR
Robert LESTRADE CARLUER DE KYVON
BY
ATTORNEY

United States Patent Office 3,461,770
Patented Aug. 19, 1969

3,461,770
SCREW OR LAG BOLT OF THE
WOOD-SCREW TYPE
Robert Lestrade Carluer de Kyvon, Paris, France, assignor to Expandet S.A., Paris, France
Filed June 21, 1968, Ser. No. 738,893
Claims priority, application France, June 21, 1967, 111,351
Int. Cl. F16b 33/06
U.S. Cl. 85—46                                                                    1 Claim

ABSTRACT OF THE DISCLOSURE

A wood screw or lag bolt for an expansion shield or anchor in which the crest of the thread thereof is substantially flat and the root diameter is substantially greater than the root diameter of a wood screw or lag bolt of the same nominal size.

---

The present invention relates to an improved screw or lag bolt of the wood-screw type for use in expansion shields or anchors.

Expansion shields or anchors made of plastic material are already known in which screws of the wood or metal type are inserted. Also known are expansion metal bolts particularly adapted to secure shields or anchors of large diameters to boards or walls.

One object of the present invention is to replace the said expansion metal bolts by extending the knowledge acquired in the field of shields or anchors made of plastic material. Nevertheless, it has been observed that the operating conditions of these shields or anchors for small diameters could not so easily be extended to the field of large diameters.

Indeed, a wood screw has a sharp thread and in shields or anchors of small diameters having a relatively small thickness, the insertion of the thread in the material causes the said material to be pushed out sufficiently for the sleeve to bulge and extend so as to be secured in the hole to which it is intended.

In an expansible shield having a large diameter where the thickness of the material is relatively important, cutting of the material by a sharp thread does not have as important an effect on the bulging of the shield and it has been observed that, proportionately speaking, the resistance to withdrawal of a large expansible shield or anchor is proportionately much smaller than with a small one.

It is consequently one of the objects of the invention to provide a wood screw or lag bolt that can penetrate, by mere threading, in a shield or anchor without the said wood screw or lag bolt being provided with a sharp or cutting thread. This wood screw or lag bolt has, however, nothing in common with a metal screw which is always inserted in a body previously provided with threading adapted to receive the thread of the screw, to its own dimensions.

Another object of the invention, which moreover completes the first one and is in the same sense, resides in the provision of an improved wood screw or lag bolt so made as to cause the said necessary appreciable bulging of the shield or anchor in the case of large diameters. Indeed, if the diameter of the screw in the hollow portion of the thread is of standard dimension, experience shows that it is too deep to come to contact the inner surface of the shield or anchor, which is already pushed out by the flattened thread, and to efficiently participate in pushing out the shield material. Under these conditions, the inventor has found that the resistance to the withdrawal of the shield or anchor could be considerably improved when a wood screw or lag bolt provided with a shallower hollow thread portion was used, i.e., a hollow portion having a diameter greater than the standard dimension.

Under these conditions, a wood screw or lag bolt having the two afore-mentioned structural features penetrates less into the material of the shield than does a screw having a sharp thread which cuts into it to make its own path, but on the other hand, due to the flattening of the thread and the use of a larger diameter for the hollow portion of the threaded part, the said screw pushes the material out more efficiently rather than cut it and thus causes, in the field of large shields or anchors where it is used, a much greater radial compression and bulging and considerably increases the shield resistance to withdrawal.

A wood screw or lag bolt made according to the invention is then essentially characterized by the fact that it comprises, as compared to a corresponding wood screw of the same diameter and pitch, first a thread the outer surface of which is not sharp but rather flat in notable proportions and, second, the diameter of the thread hollow portion is appreciably increased in relation to the standard root diameter.

The envelope of the flattened thread is generally cylindrical except in the terminal portion of the screw where it is sharply conical.

Other features and advantages of the invention will appear as the following description proceeds, having reference to the appended drawing illustrating nonrestrictive examples and wherein.

Figure 1:
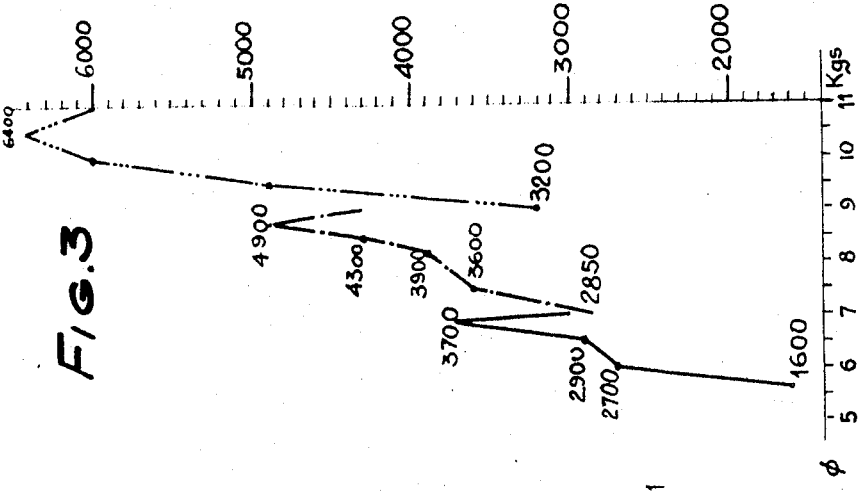
FIGURE 1 is a diagrammatical side elevation view of a square head wood screw according to French standards.

In the embodiment illustrated in FIGURE 1, $d$ is the nominal diameter of the wood screw, $n$ the diameter of the thread bottom or root diameter and $t$ the thickness of the sharp portion of the thread.

Figure 2:
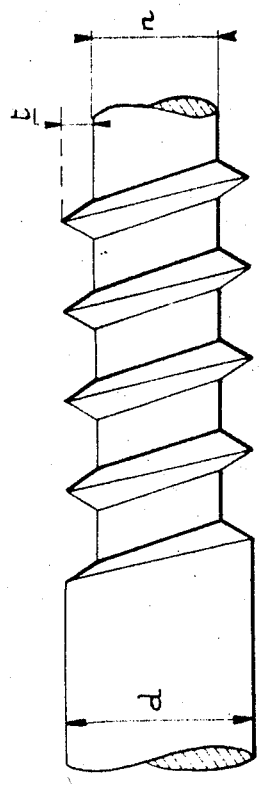
FIGURE 2 is a corresponding side elevation view of a screw made according to the invention, having the same diameter and pitch.

A wood screw or lag bolt made according to the invention, as shown in FIGURE 2, comprises for the same nominal diameter $d$ and the same pitch, a root diameter $n1$ greater than $n$ and a thickness $t1$ of the cutting part of thread smaller than $t$.

It is thus seen that the root diameter of the thread has been appreciably increased and that, on the other hand, the sharp portion of the thread has been appreciably flattened.

It will nevertheless be noted that the terminal portion $1a$ of the screw has the usual conventional conical shape to permit easy insertion of the wood screw or lag bolt in the hollow cylindrical portion of the expansible shield or anchor.

The advantages of this wood screw arrangement result clearly from the preamble of the present specification.

It is, however, to be noted that if it is important to make a flattened thread to obtain satisfactory results, there are, nevertheless, limits in the variation of the root diameter to obtain the maximum withdrawal resistance.

The following tables bring out, for three different types of expansible shields or anchors made of plastic material of different diameters, the variations in the respective resistance of the lag bolt in relation to the variable selected dimensions in each case for different values of $n1$.

TESTS WITH LAG BOLTS HAVING DIFFERENT ROOT DIAMETERS

A. Shield: dia. 10 mm., length 60 mm., lag bolt: dia. 8 mm., length 90 mm. (useful fixing length: 70 mm.).

| Root dia. | Designation | Resistance in kg. | Notes |
|---|---|---|---|
| 5.6 | Usual lag bolt | 1,600 | Lag bolt broken. |
| 6 | 100 kg. special lag bolt | 2,700 | Lag bolt pulled out. |
| 6.5 | do | 2,900 | Do. |
| 6.75 | do | ¹3,700 | Do. |
| 7 | do | ¹3,000 | Do. |

¹ Maximum.

B. Shield: dia. 12 mm., length 60 mm., lag bolt: dia. 10 mm., length 85 mm. (useful fixing length: 70 mm.).

| Root dia. | Designation | Resistance in kg. | Notes |
|---|---|---|---|
| 7 | Usual lag bolt | 2,850 | Lag bolt broken. |
| 7.5 | 100 kg. special lag bolt | 3,600 | Lag bolt pulled out. |
| 8.25 | do | 3,900 | Do. |
| 8.5 | do | 4,300 | Do. |
| 8.75 | do | ¹4,900 | Do. |
| 9 | do | 4,300 | Do. |

¹ Maximum.

C. Shield: dia. 14 mm., length 75 mm., lag bolt: dia. 12 mm., length 120 mm. (useful fixing length: 90 mm.).

| Root dia. | Designation | Resistance in kg. | Notes |
|---|---|---|---|
| 9 | Usual lag bolt | 3,200 | Lag bolt broken. |
| 9.5 | 100 kg. special lag bolt | 4,900 | Lag bolt pulled out. |
| 10 | do | 6,000 | Do. |
| 10.5 | do | ¹6,400 | Do. |
| 11 | do | 6,000 | Do. |

¹ Maximum.

Figure 3:
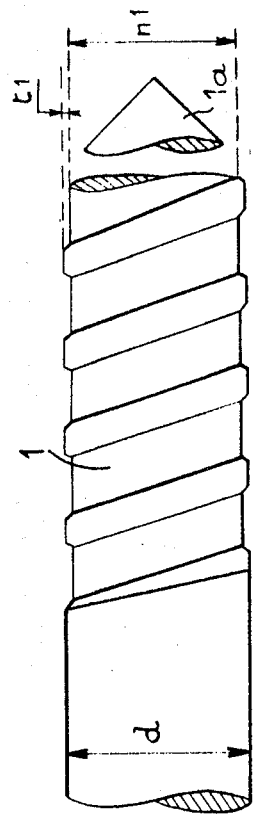
FIGURE 3 is a curve illustrating the variations in the resistance to withdrawal of three expansible shields having different diameters and used with screws improved according to the invention but of different characteristics.

The results have been plotted in the curves of FIGURE 3.

As clearly comes out from these curves, the resistance to withdrawal increases as $n1$ increases but up to a certain value where this withdrawal resistance goes through a maximum. Beyond this limit value, if $n1$ is further increased, it will be noted that the resistance to withdrawal starts to decrease. This is easily explained because, starting with a certain predetermined increase of $n1$, the lag bolt can be assimilated to a cylinder which, at the limit, has no holding means within the shield, to the very extent besides where such a limit lag bolt could have been inserted in said shield.

It can be observed, for instance, that for shields having 10 and 12 mm., the usual lag bolts have root diameters of 5.6 and 7 mm., respectively. For each of these two cases, the value $n1$ to obtain the maximum pullout condition are 6.75 and 8.75. It will thus be observed that the root diameter increase for each of these two cases is 20 percent and 25 percent, respectively.

In the third case, that is the one corresponding to the 14 mm. shield, the maximum resistance is obtained for a root diameter increase of 1.5 mm., that is an increase of 17 percent.

Of course, the results would possibly be different if the tests were carried out with shields having a shape and a diameter other than those which were used; but it can be said that for the shields in question an average root increase of 20 percent and a substantial flattening of the thread make it possible to obtain considerable increase in resistance, since, in the first instance, the resistance for an ordinary lag bolt goes from 1600 kg. to 3700 kg. maximum in the best condition. In the second case, it goes from 2850 kg. to 4900 kg. and in the third instance from 3200 kg. to 6400 kg. This means that generally, the resistance is at least double that of with an ordinary lag bolt.

I claim:

1. A wood screw or lag bolt for an expansion shield or anchor comprising: a threaded portion in which the thread thereof is formed with a substantially flat crest lying in a substantially cylindrical envelope; in which the root diameter of said thread is substantially 20% greater than the root diameter of the thread of a standard wood screw or lag bolt of the same nominal size, and in which the root surface also lies in a substantially cylindrical envelope.

References Cited

UNITED STATES PATENTS 2,787,186   4/1957   Broglotti _____ 85—46

FOREIGN PATENTS 175,558   6/1961   Sweden.

EDWARD C. ALLEN, Primary Examiner